Oct. 18, 1949.  A. H. TAYLOR  2,485,418
METER FOR MEASUREMENT OF ULTRAVIOLET RADIATION
Filed May 28, 1947
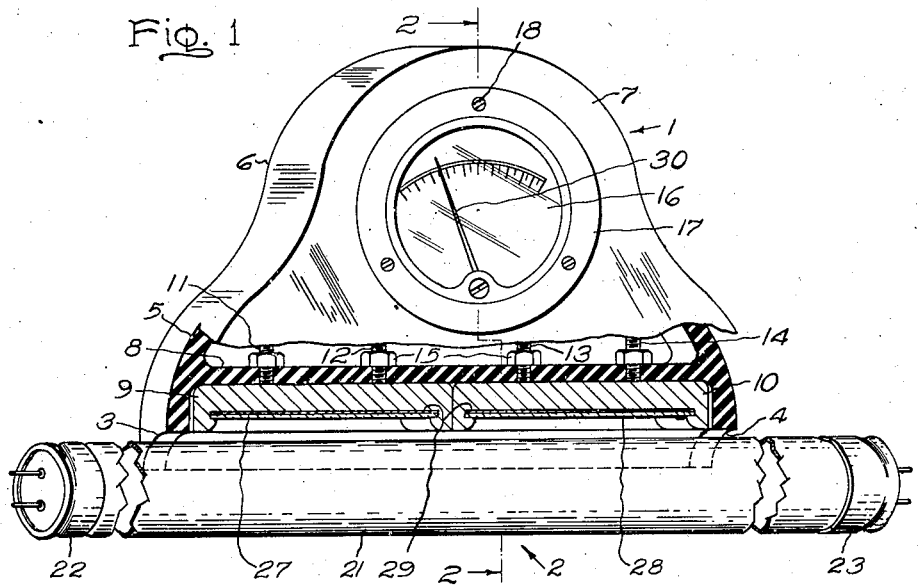
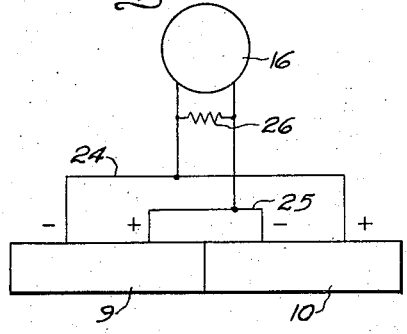
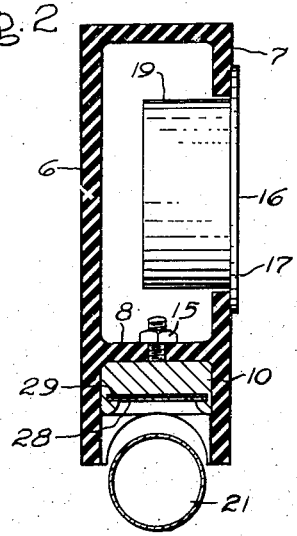
Inventor:
Augustus Hadley Taylor,
by Vernet C. Kauffman
His Attorney.

Patented Oct. 18, 1949

2,485,418

UNITED STATES PATENT OFFICE 2,485,418

METER FOR MEASUREMENT OF ULTRA-VIOLET RADIATION

Augustus Hadley Taylor, East Cleveland, Ohio, assignor to General Electric Company, a corporation of New York Application May 28, 1947, Serial No. 751,037

1 Claim. (Cl. 250—83.3)

My invention relates to portable meters for the measurement of radiant energy and its principal object is to provide a light weight, compact, rugged meter for measuring the total output of radiant energy in a selected region of the spectrum emitted by a tubular lamp. Further objects and advantages of the invention will appear from the following description and from the drawing in which Fig. 1 is a perspective view, partly in section, of a meter embodying my invention and a perspective view of a commercial germicidal lamp; Fig. 2 is a sectional view of the meter and the lamp along the line 2—2 of Fig. 1; and Fig. 3 is a wiring diagram of the meter.

Referring to Figs. 1 and 2 of the drawing the light meter comprises a casing 1 the bottom of which is elongated and generally trough shaped to accommodate and partially enclose a longitudinal portion of the tubular lamp 2. The ends 3 and 4 of the side wall 5 of the casing are recessed in the form of circular arcs and the front and back walls 6 and 7 extend downward to the ends of the side wall as shown in Fig. 2. The bottom wall 8 of the casing 1 is recessed therein a sufficient distance to support two elongated light sensitive cells 9 and 10 in end-to-end relation above the portion of the lamp 2 engaged by the curved ends 3 and 4 of the side wall 5 of the casing 1. Each of the cells 9 and 10 is attached to the bottom wall 8 by its two terminal posts 11 and 12, 13 and 14, respectively, which are screw-threaded and pass through openings in the bottom wall 5 to engage the holding nuts 15.

A microammeter 16 is supported in the upper part of the casing 1 by its annular flange 17 secured to the front wall 7 of the casing by a number of screws 18. Other instruments for detecting and measuring very small currents, such as a galvanometer, may be substituted for the microammeter. The body 19 of the microammeter 16 extends through an opening in the front wall 7 of the casing with its face about flush with the wall 7.

The tubular lamp 2 is of the type disclosed in the U. S. Patent 2,182,732, issued December 5, 1939, to Meyer et al. and comprises a tubular glass envelope 21 which transmits radiation of 2537 angstroms wave length and contains a pair of cooperating discharge-supporting electrodes (not shown) and a conducting gaseous atmosphere of argon or other rare gas and mercury vapor which emits such radiation. Such lamps are commercially available and are provided with pronged bases 22 and 23 at their ends to engage spaced sockets in supporting fixtures. The meter of my invention may be used to determine the total output of radiation of 2537 angstroms wave length of such lamps without removing the lamps from the fixture.

As shown in the wiring diagram of Fig. 3 the light sensitive cells 9 and 10 of the meter are connected in series in a closed circuit and the microammeter 16 is connected across the leads 24 and 25 connecting the cells in series. A fixed resistor 26 is connected in parallel with the microammeter. The cells 9 and 10 are of the blocking-layer type sensitive to radiant energy having wave lengths between about 3,000 and 8,000 angstroms with their peak sensitivity between about 4,000 to 6,000 angstroms. Such cells are commercially available and their characteristics are well known to those skilled in photometry.

One cell 9 has a cover 27 of quartz or a special glass which transmits radiation of 2537 angstroms wave length emitted by the lamp while the cover 28 of the other cell 10 is of ordinary glass which does not transmit such energy. Both covers 27 and 28 are coated on the side next to the light sensitive layer of the cell and away from the lamp with a suitable phosphor layer 29 (Fig. 2), such as manganese-activated zinc silicate. The two cells 9 and 10 are selected so as to have the same response to ordinary light and the two covers 27 and 28 are given identical coatings of the phosphor so that the effect of ordinary light on the cells 9 and 10 balances out, that is, both cells generate equal currents and no current flows through the microammeter 16.

When the light meter is placed against the lamp envelope 21, however, the phosphor coating 29 on the quartz cover 27 of cell 9 becomes fluorescent and the light emitted thereby causes the light sensitive layer of the cell 9 to generate more current than that of the cell 10 the phosphor coating of which cannot be excited by the 2537 angstroms wave length radiation which is cut off by the ordinary glass cover 28 of cell 10. The difference in current generated by the two cells 9 and 10 is measured by the microammeter 16. The deflection of the needle 30 of the microammeter is in proportion to the difference in current generated by the cells 9 and 10 and this difference is in proportion to the intensity of the 2537 angstroms wave length energy emitted by the lamp 2. By proper selection of the fixed resistor 26 connected in parallel with the microammeter 16 the latter may be calibrated so that the total output of radiation of 2537 angstroms wave length emitted by lamps 2 of a specified size may be read directly from the dial.

What I claim as new and desire to secure by Letters Patent of the United States is:

A compact, portable light meter for measuring the total light output in a particular spectral region of a tubular lamp of a predetermined size, comprising a narrow casing having front and back walls and a side wall the ends of which define with said front and back walls an elongated opening in the bottom of said casing for receiving a longitudinal portion of the lamp, the end portions of said side wall being cut out in the form of semi-circular arcs to engage the tubular lamp envelope received within said opening, the width of said opening being approximately equal to the outer diameter of said envelope so that light from said lamp portion only is received within said casing, said casing having a bottom wall recessed therein and a pair of series-connected, light-sensitive cells mounted end to end on and along the said bottom wall and facing the opening in the casing for receiving the lamp, both of said cells being equally responsive to radiation in spectral regions other than that to be measured and one cell only being responsive to radiation in that region, and a current-measuring device connected across the leads connecting the cells in series so as to measure the difference in current generated by the respective cells, being calibrated to indicate the total output of the lamp in the spectral region to be measured and being mounted in the casing with its face exposed to view above the opening in said casing and in a direction transverse to said opening.

AUGUSTUS HADLEY TAYLOR.

REFERENCES CITED

The following references are of record in the file of this patent:

UNITED STATES PATENTS

| Number | Name | Date |
| --- | --- | --- |
| 2,114,163 | Bird | Apr. 12, 1938 |
| 2,200,853 | Porter et al. | May 14, 1940 |
| 2,349,754 | Porter | May 23, 1944 |

FOREIGN PATENTS

| Number | Country | Date |
| --- | --- | --- |
| 482,354 | Great Britain | June 19, 1936 |
| 539,420 | France | Apr. 1, 1922 |